US009173193B2

(12) United States Patent
Li et al.

(10) Patent No.: US 9,173,193 B2
(45) Date of Patent: Oct. 27, 2015

(54) SUPPORT FOR BROADCAST CONTROL HEADER FOR WIRELESS NETWORKS

(71) Applicant: Nokia Siemens Networks Oy, Espoo (FI)

(72) Inventors: Shaohua Li, Beijing (CN); Xin Qi, Beijing (CN); Chao Wei, Beijing (CN)

(73) Assignee: Nokia Solutions And Networks Oy, Espoo (FI)

( * ) Notice: Subject to any disclaimer, the term of this patent is extended or adjusted under 35 U.S.C. 154(b) by 165 days.

(21) Appl. No.: 13/862,169

(22) Filed: Apr. 12, 2013

(65) Prior Publication Data
US 2013/0223390 A1 Aug. 29, 2013

Related U.S. Application Data

(62) Division of application No. 12/496,341, filed on Jul. 1, 2009, now abandoned.

(60) Provisional application No. 61/078,347, filed on Jul. 4, 2008, provisional application No. 61/110,523, filed on Oct. 31, 2008.

(51) Int. Cl.
| | |
|---|---|
| *H04W 72/04* | (2009.01) |
| *H04W 72/00* | (2009.01) |
| *H04L 5/00* | (2006.01) |
| *H04W 28/06* | (2009.01) |
| *H04M 1/00* | (2006.01) |
| *H04W 48/12* | (2009.01) |

(52) U.S. Cl.
CPC ........... *H04W 72/005* (2013.01); *H04L 5/0007* (2013.01); *H04L 5/0044* (2013.01); *H04L 5/0053* (2013.01); *H04W 28/065* (2013.01); *H04L 5/0039* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 7,952,989 B2 | 5/2011 | Qi et al. | |
| 8,547,926 B2 * | 10/2013 | Yuk et al. | 370/330 |
| 8,848,627 B2 * | 9/2014 | Yuk et al. | 370/329 |

(Continued)

OTHER PUBLICATIONS

IEEE, "IEEE Standard for Information Technology—Telecommunications and information exchange between systems—Local and metropolitan area networks—Specific requirements,", Part 11: Wireless LAN Medium Access Control (MAC) and Physical Layer (PHY) Specifications; IEEE Computer Society, IEEE Std. 802.11-2007, Jun. 12, 2007, 1231 pages., IEEE Computer Society, IEEE Std 802.11™-2007,(Jun. 12, 2007), 1231 pages.

(Continued)

*Primary Examiner* — Eunsook Choi
(74) *Attorney, Agent, or Firm* — Brake Hughes Bellermann LLP

(57) ABSTRACT

Various example embodiments are disclosed herein related to broadcast control headers for wireless networks. According to an example embodiment, a method may include allocating resources for a broadcast channel for a wireless network may include determining a set of physical resource units (PRUs), each PRU including a plurality of contiguous subcarriers, selecting one or more subsets of the PRUs, each subset including a plurality of PRUs distributed across the set of PRUs, and determining a plurality of logical resource units (LRUs) from each subset of PRUs, including permutating the subcarriers independently within each subset of PRUs to obtain the plurality of LRUs for each subset of PRUs, each LRU including a plurality of distributed subcarriers.

17 Claims, 14 Drawing Sheets

310
Example Superframe structure

(56) References Cited

U.S. PATENT DOCUMENTS

| | | | |
|---|---|---|---|
| 2008/0039133 A1* | 2/2008 | Ma et al. | 455/552.1 |
| 2008/0240034 A1 | 10/2008 | Gollamudi | |
| 2009/0185543 A1* | 7/2009 | Chen et al. | 370/338 |
| 2009/0197599 A1 | 8/2009 | Cho et al. | |
| 2009/0285168 A1 | 11/2009 | Choi et al. | |
| 2010/0002641 A1 | 1/2010 | Li et al. | |
| 2010/0009691 A1 | 1/2010 | Choi et al. | |
| 2010/0272043 A1* | 10/2010 | Cho et al. | 370/329 |
| 2011/0055652 A1 | 3/2011 | Park | |
| 2012/0069764 A1 | 3/2012 | Classon et al. | |

OTHER PUBLICATIONS

Hamiti, Shkumbin "The Draft IEEE 802.16m System Description Document", IEEE 802.16 Broadband Wireless Access Working Group, IEEE 802.16m-08/003r3, <http://ieee802.org/16>, (Jun. 16, 2008), 56 pages.

Cudak, Mark "IEEE 802.16m System Requirements", IEEE 802.16 Broadband Wireless Access Working Group, IEEE 802.16m-07/002r4, <http://ieee802.org/16>, (Oct. 19, 2007), 26 pages.

Li, Zexian et al., "Proposed Baseline Content on the Downlink Control Structure for the 802.16m SDD", IEEE 802.16 Broadband Wireless Access Working Group; 802.16m-08/015r1, Charter and Scope of TGm Rapporteur Groups, <http://ieee802.org/16>, (May 14, 2008), 9 pages.

Chang, Sungcheol et al., "A DL Control Structure in IEEE 802.16m", IEEE 802.16 Presentation Submission Template (Rev. 9); S802.16m-08/207, (Mar. 18, 2008), 16 pages.

* cited by examiner

SUPPORT FOR BROADCAST CONTROL HEADER FOR WIRELESS NETWORKS

PRIORITY CLAIM

This application is a divisional application of U.S. application Ser. No. 12/496,341, entitled "Support For Broadcast Control Header For Wireless Networks," hereby incorporated by reference, which claims priority to U.S. Provisional application Ser. No. 61/078,347 filed on Jul. 4, 2008, entitled "Support For Broadcast Control Header For Wireless Networks," hereby incorporated by reference. U.S. application Ser. No. 12/496,341 also claims priority to U.S. Provisional application Ser. No. 61/110,523 filed on Oct. 31, 2008, entitled "Support For Broadcast Control Header For Wireless Networks," hereby incorporated by reference.

TECHNICAL FIELD

This description relates to wireless networks, and also to broadcast control information.

BACKGROUND

Broadcast control information in a wireless network may include a variety of fields, and may be used to communicate different kinds of information using different fields. The broadcast control information must be mapped to physical (PHY) resources before wireless transmission.

SUMMARY

According to an example embodiment, a method of allocating resources for a broadcast channel for a wireless network may include determining a set of physical resource units (PRUs), each PRU including a plurality of contiguous subcarriers, selecting one or more subsets of the PRUs, each subset including a plurality of PRUs distributed across the set of PRUs, and determining a plurality of logical resource units (LRUs) from each subset of PRUs, including permutating the subcarriers independently within each subset of PRUs to obtain the plurality of LRUs for each subset of PRUs, each LRU including a plurality of distributed subcarriers.

According to an example embodiment, a method of allocating resources for a broadcast channel for a wireless network may include determining a first group of physical resource units (PRUs) and a second group of PRUs, each PRU including a plurality of contiguous subcarriers across one or more symbols, performing the following for each of the first group and the second group of PRUs to obtain a first group of logical resource units (LRUs) from the first group of PRUs and to obtain a second group of LRUs from the second group of PRUs: selecting one or more subsets of the PRUs within the group of PRUs, each subset including a plurality of PRUs distributed across the group of PRUs; and determining a plurality of LRUs from each subset of PRUs, including permutating the subcarriers independently within each subset of PRUs to obtain the plurality of LRUs for each subset of PRUs, each LRU including a plurality of distributed subcarriers.

According to another example embodiment, a method may include transmitting, via a wireless network, at least a first subframe of the first superframe including a broadcast control header (BCH), the first superframe including a plurality of subframes, the BCH including a system configuration information that describes: 1) the system configuration of all subframes of the first superframe except the first subframe of the first superframe, and 2) a first subframe of a second or subsequent superframe to be transmitted.

According to another example embodiment, an apparatus may include a wireless transceiver; a controller coupled to the transceiver. The transceiver, under control of the controller, may be configured to: transmit, via a wireless network, at least a first subframe of the first superframe including a broadcast control header (BCH), the first superframe including a plurality of subframes, the BCH including a system configuration information that describes: 1) the system configuration of all subframes of the first superframe except the first subframe of the first superframe, and 2) a first subframe of a second or subsequent superframe to be transmitted.

According to another example embodiment, a method may include receiving, by a MS, via a wireless network, at least a first subframe of a first superframe including a broadcast control header (BCH), the first superframe including a plurality of subframes, the BCH of the first superframe including a system configuration information that describes: 1) the system configuration of all subframes of the first superframe except the first subframe of the first superframe, and 2) a first subframe of a second or subsequent superframe; receiving, by a MS, at least a first subframe of the second superframe; and decoding the first subframe of the second superframe based on the system configuration information received in the BCH of the first superframe.

According to an example embodiment, a method may include transmitting, by a BS, via a wireless network, at least a first subframe of a first superframe, the first subframe including a broadcast control header (BCH), the BCH including a system configuration information that describes: 1) the system configuration of all subframes of the first superframe, and 2) a first subframe of a second or subsequent superframe.

According to another example embodiment, an apparatus may include a wireless transceiver, a controller coupled to the transceiver, wherein the transceiver, under control of the controller, may be configured to: transmit, via a wireless network, at least a first subframe of a first superframe, the first subframe including a broadcast control header (BCH), the BCH including a system configuration information that describes: 1) the system configuration of all subframes of the first superframe, and 2) a first subframe of a second or subsequent superframe.

According to another example embodiment, a method may include receiving, via a wireless network, at least a first subframe of a first superframe including a broadcast control header (BCH), the first superframe including a plurality of subframes, the BCH including a system configuration information that describes: 1) the system configuration of all subframes of the first superframe, and 2) a first subframe of a second or subsequent superframe.

According to yet another example embodiment, an apparatus may include a wireless transceiver, a controller coupled to the transceiver, wherein the transceiver, under control of the controller, may be configured to: receive, via a wireless network, at least a first subframe of a first superframe including a broadcast control header (BCH), the first superframe including a plurality of subframes, the BCH including a system configuration information that describes: 1) the system configuration of all subframes of the first superframe, and 2) a first subframe of a second or subsequent superframe; receive at least the first subframe of the second superframe; and decode the first subframe of the second superframe based on the system configuration information received in the BCH of the first superframe.

According to another example embodiment, a method may include determining a set of physical resource units (PRUs), each PRU including a plurality of contiguous subcarriers, selecting one or more subsets of the PRUs, each subset including a plurality of PRUs distributed across the set of PRUs, and determining a plurality of logical resource units (LRUs) from each subset of PRUs, including directly mapping the subcarriers from the PRUs of the subset to the LRUs.

According to another example embodiment, an apparatus may include a wireless transceiver, and a controller coupled to the transceiver. The transceiver, under control of the controller, may be configured to: determine a set of physical resource units (PRUs), each PRU including a plurality of contiguous subcarriers; select one or more subsets of the PRUs, each subset including a plurality of PRUs distributed across the set of PRUs; and determine a plurality of logical resource units (LRUs) from each subset of PRUs by either directly mapping the subcarriers from the PRUs of the subset to the LRUs, or by permutating the subcarriers independently within each subset of PRUs to obtain the plurality of LRUs for each subset of PRUs.

The details of one or more implementations are set forth in the accompanying drawings and the description below. Other features will be apparent from the description and drawings, and from the claims.

DETAILED DESCRIPTION

Figure 1:
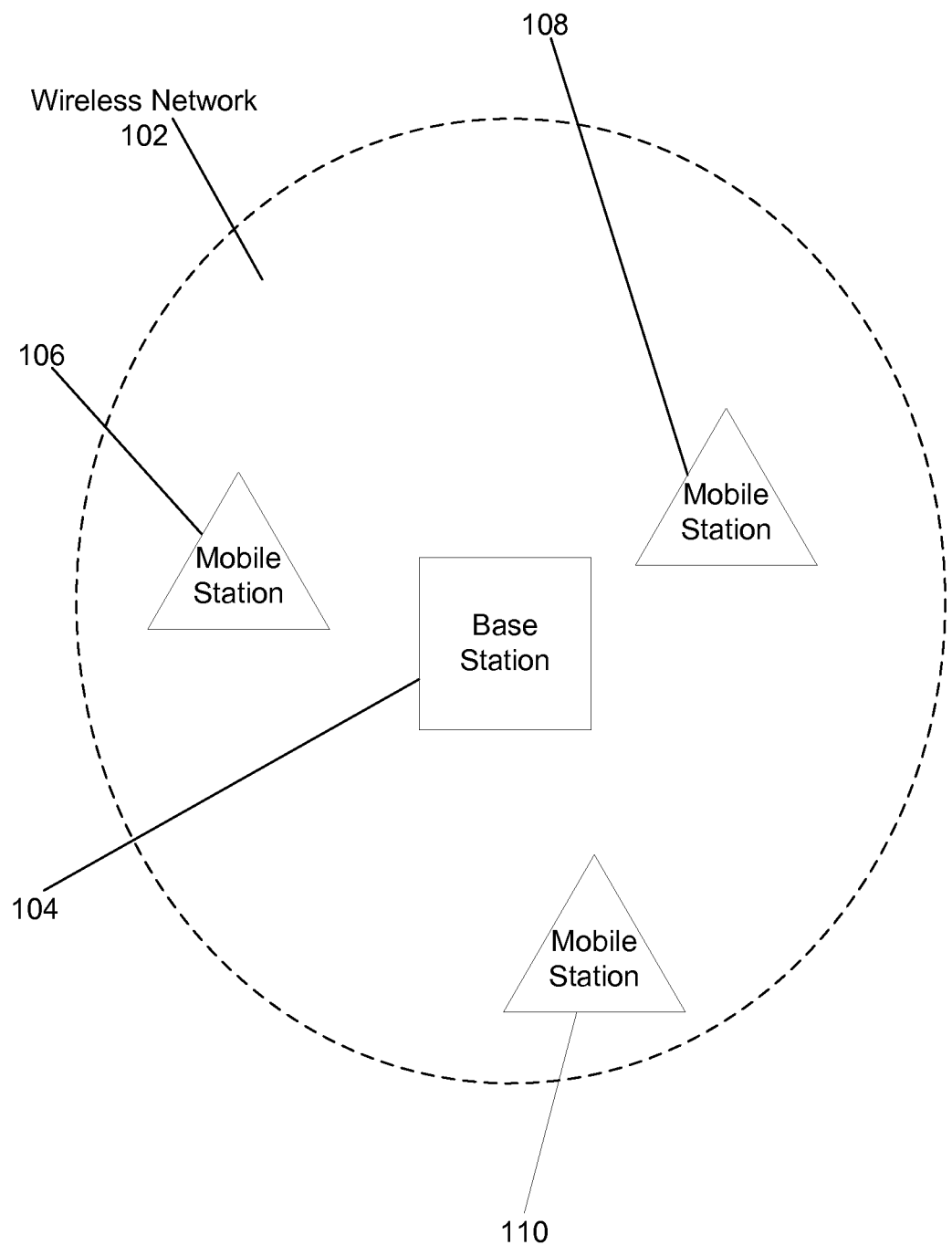
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 IEEE 802.16 Worldwide interoperability for Microwave Access (WiMAX) networks (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Figure 2:
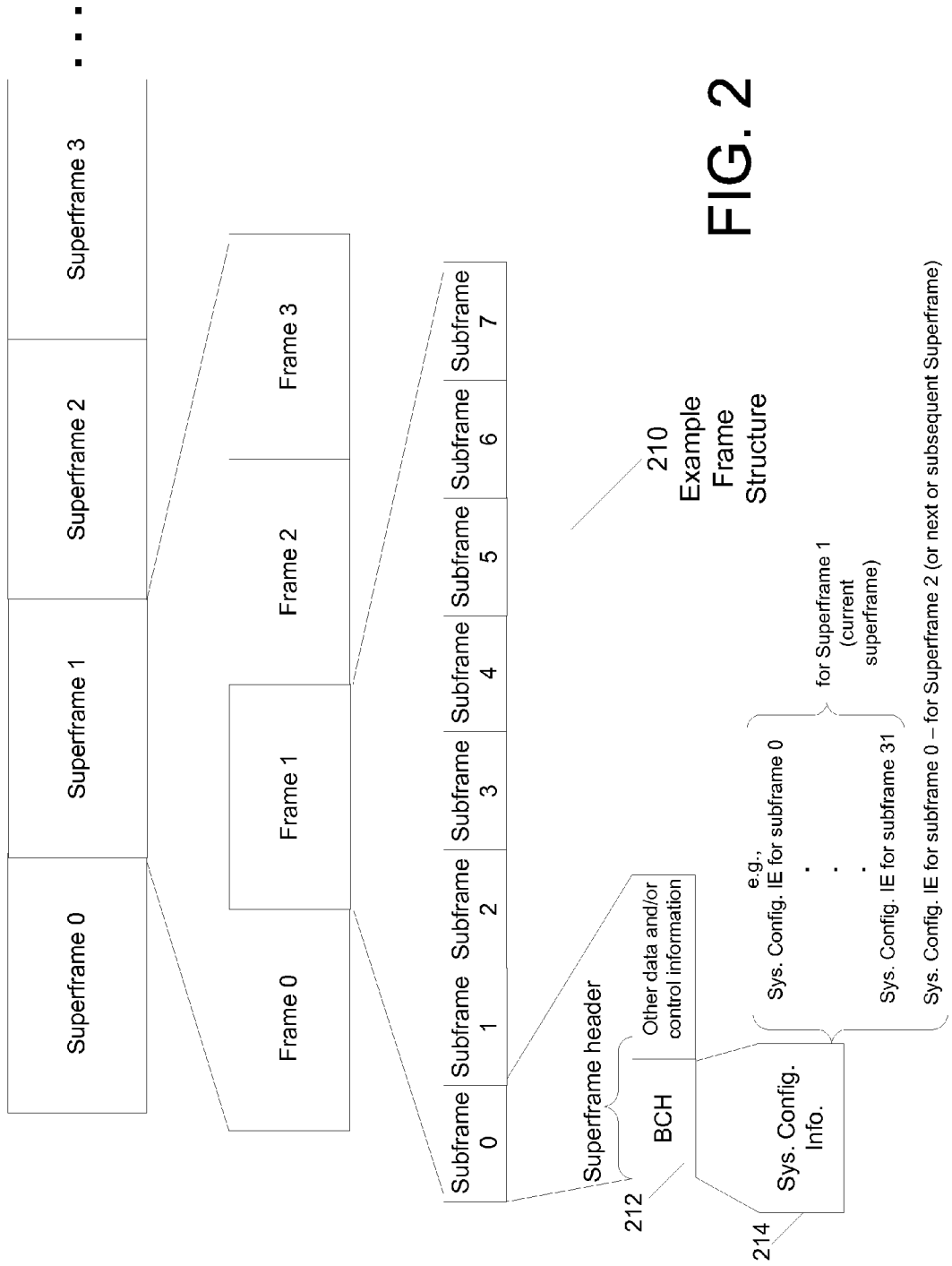
FIG. 2 is a diagram illustrating a frame structure 210 according to an example embodiment.

FIG. 2 is a diagram illustrating a frame structure 210 according to an example embodiment. As shown in FIG. 2, several superframes are shown, including superframe 0, superframe 1, superframe 2, superframe 3, . . . . Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols, depending on a type of the subframe. These are merely examples, and a subframe may include any number of resources or OFDM symbols.

Each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104. A Map (or Maps) and/or other control information may be included within each submap that may identify resources within the submap allocated for UL or DL transmission.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0). The SFH may include a number of fields, including a broadcast channel (BCH) 212. The BCH 212 may be used by the BS 104 to broadcast to all MSs or provide essential system parameters and system configuration information 214. The BCH 212 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 212 may be frequency division multiplexed with data within the same subframe (subframe 0).

As noted, BCH 212, e.g., provided within a first subframe of a superframe, may include system configuration information 214. System configuration information 214 may include or describe the system configuration of one or more (or each) of the subframes of a superframe. In some cases, the system configuration information 214 may be considered essential for decoding subframes. System configuration information 214 may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, the system configuration information 214 included in the BCH 212 may include a system configuration information element (system configuration IE) describing the system configuration for each of the subframes in the current superframe. For example, system configuration information 214 within superframe 1 may be provided within the BCH of subframe 0, and may include a system configuration IE for each (or one or more) of the subframes of superframe 1. For example, there may be a system configuration IE for each subframe of the superframe 1, e.g., 32 system configuration IEs, including a system configuration describing the system configuration of subframe 0, a system configuration IE describing the system configuration of subframe 1, . . . and a system configuration IE describing the system configuration of subframe 31 of superframe 1 (the current superframe).

According to an example embodiment, if the system configuration information is provided only for the current superframe, then each MS may typically need to receive the first subframe, and decode the system configuration information in the first subframe before the MS can receive data and other control information within the first subframe. Thus, waiting for the MS to receive and decode the system configuration information in the current superframe may introduce some significant delay.

Therefore, according to an example embodiment, the system configuration of a first subframe of a current superframe may be communicated or provided to MSs via the system configuration information 214 in a previous superframe. In this manner, a MS may receive system configuration information (describing the system configuration of one or more subframes of superframe 1, and describing the system configuration of subframe 0 of superframe 2) within subframe 0 of superframe 1. Then, upon receipt of subframe 0 of superframe 2, the MS may decode the entire subframe 0 (or first subframe) of superframe 2, without having to wait to decode the system configuration information within that subframe. Thus, providing system configuration information in a current superframe that describes the system configuration of the first subframe of a next (or subsequent) superframe may reduce decoding delay or latency at the MSs, for example. Thus, as shown in FIG. 2, the system configuration information 214 within superframe 1 may include system configuration IEs for subframes 0-31 of superframe 1, and may also include a system configuration IE for subframe 0 of superframe 1 (or the next superframe to be transmitted by the BS 104).

Figure 3:
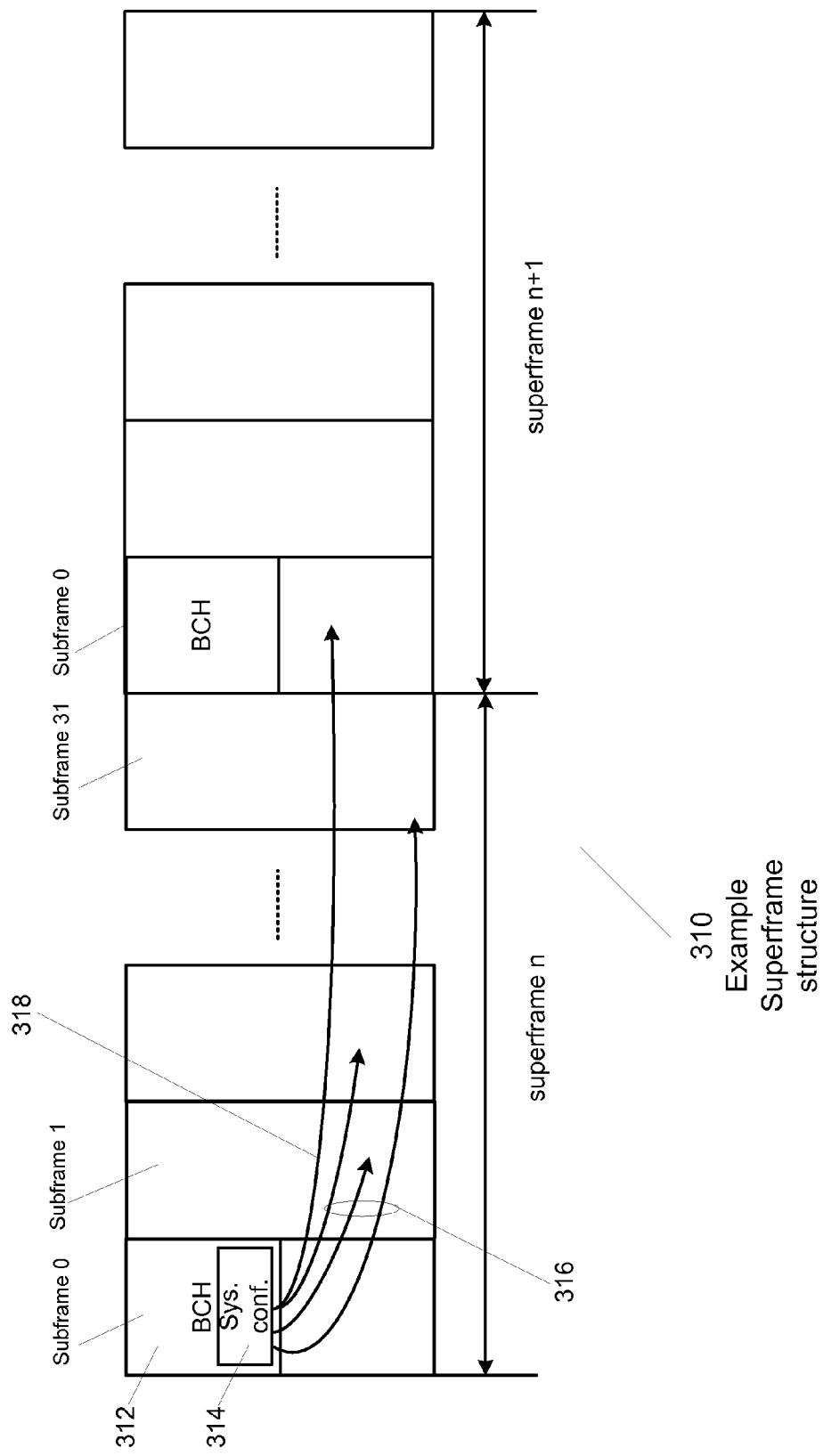
FIG. 3 is a diagram illustrating an example superframe structure 310 according to another example embodiment.

FIG. 3 is a diagram illustrating an example superframe structure 310 according to another example embodiment. Superframe n is followed by superframe n+1, for example. Each superframe includes a number of subframes. For example, superframe n may include subframe 0, subframe 1, . . . subframe 31. Superframe n+1 may similarly include subframe 0, subframe 1, . . . subframe 31. The first subframe (subframe 0) within each superframe may include a BCH 312. The BCH 312 may include a system configuration information 314 that describes: 1) the system configuration of all subframes of superframe n, except the first subframe, as represented by lines 316 in FIG. 3; and, 2) the system configuration of a first subframe (subframe 0) of superframe n+1 (the subsequent superframe), as represented by line 318. Thus, according to an example embodiment, the system configuration information 314 of superframe n may omit system configuration information for the first subframe of superframe n, since this system configuration information was provided in the previous superframe (superframe n−1). Thus, in an example embodiment, overhead of superframe n may be reduced by omitting the system configuration of the first subframe of superframe n from the system configuration information 314 in superframe n. In an example embodiment, lines 316 and 318 are not actually present in the superframes, but are used in FIG. 3 to represent or reflect for which subframes the system configuration information 314 describes the system configuration.

Referring to the frame structure of FIG. 3, a MS may be asleep when superframe n arrives, and therefore, may not have the system configuration information for the first subframe (subframe 0) of superframe n+1. Thus, the MS may be unable to decode all or part of superframe n+1. Instead, the MS may receive the system configuration information (within superframe n+1) that describes the first subframe of superframe n+2, and thus, may have to wait until superframe n+2 to decode the full superframe. This may create delay or latency, for example, when a MS awakens from a sleep mode. Thus, as described below with reference to FIG. 4, it may be advantageous for the system configuration information 314 to describe the system configuration of all subframes of the current superframe (including the first subframe).

Figure 4:
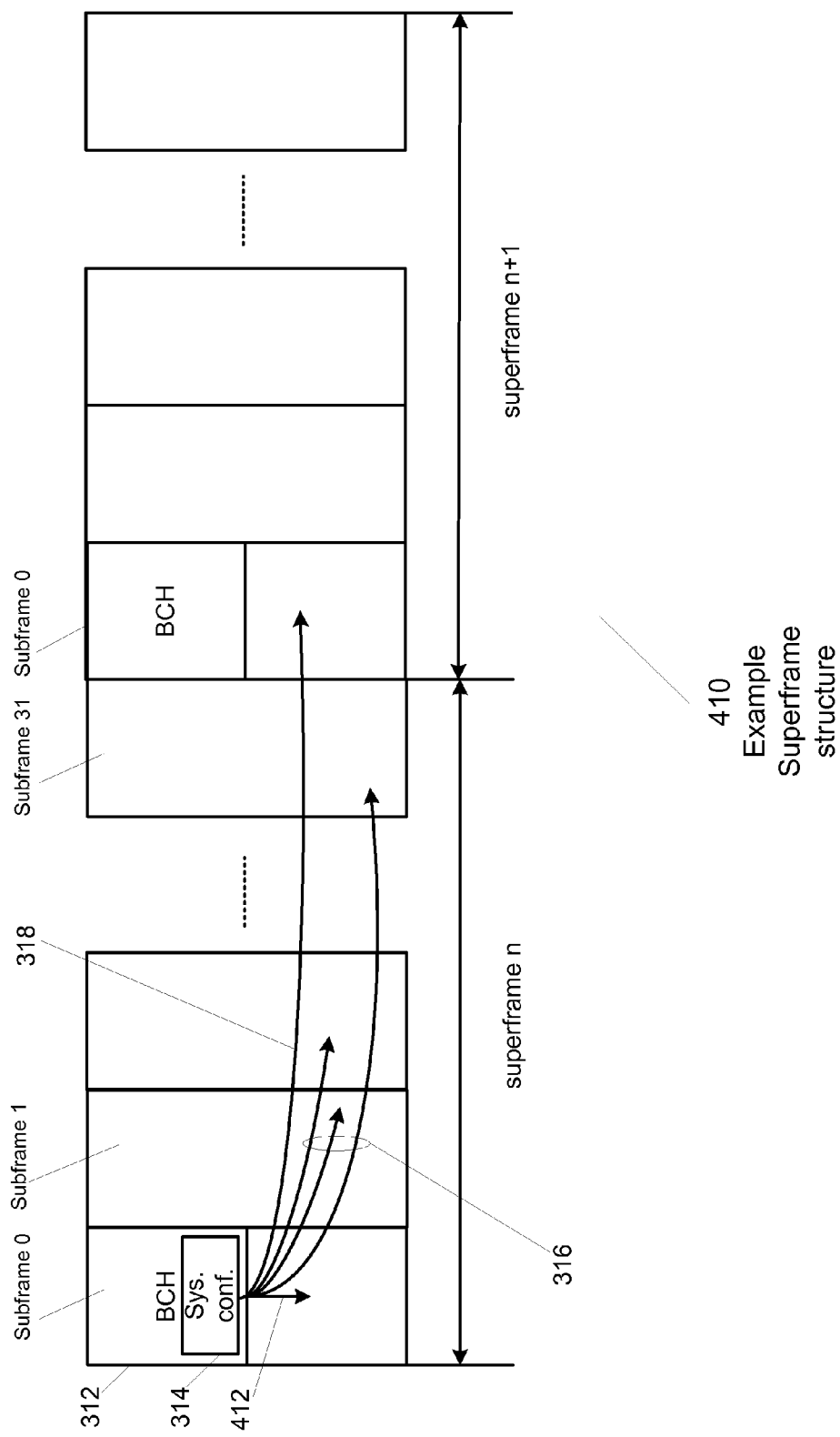
FIG. 4 is a diagram illustrating an example superframe structure 410 according to another example embodiment.

FIG. 4 is a diagram illustrating an example superframe structure 410 according to another example embodiment. The superframe structure 410 is very similar to the superframe structure 310, illustrated in FIG. 3. The differences between superframe structure 410 and the superframe structure 310 will be briefly described. In the superframe structure 410 illustrated in FIG. 4, the system configuration information may describe the system configuration of all subframes (including the first subframe, as represented by line 412) of the current superframe, in addition to the first subframe of the next or subsequent superframe. This may allow a MS to recover more quickly from a sleep mode or other state where the MS may have missed the system configuration information in the previous superframe.

According to an example embodiment, each subframe may be divided into a number of frequency partitions, where each partition may include a set of physical resource units across the total number of OFDMA symbols available in the subframe. Each frequency partition can include contiguous (localized) and/or non-contiguous (distributed) physical resource units.

A physical resource unit (PRU) may be the basic physical unit for resource allocation, and may include, for example, P consecutive subcarriers across (or by) N consecutive OFDMA (Orthogonal Frequency Division Multiple Access) symbols. For example, one PRU may include 18 subcarriers across 6 OFDMA (Orthogonal Frequency Division Multiple Access) symbols, although any number of subcarriers and symbols may be used. A logical resource unit (LRU) may be the basic logical unit for distributed allocations (which may include distributed subcarriers) and localized resource allocations (which may include contiguous subcarriers). A LRU may be P*N subcarriers. One or more PRUs or LRUs may be used for a Localized Resource Allocation (LRA), which may use a channel-aware scheduling technique to select the subcarriers, to avoid frequency selective fading. One or more LRUs may be used for a distributed resource allocation (DRA), which may be used to achieve frequency diversity based on a distribution of subcarriers.

According to an example embodiment, the BCH may include broadcast control information that is broadcast to multiple MSs. Thus, a distributed resource allocation (which may include distributed subcarriers) may be used to transmit the BCH. Alternatively, a localized resource allocation (LRA) may be used to transmit the BCH (e.g., which may include contiguous subcarriers). However, since the BCH is broadcast to multiple MSs, an advantage of frequency diversity may be obtained by transmitting the BCH using resources or subcarriers, at least some of which, may be spread or distributed across a region or resource allocation.

According to an example embodiment, a set of LRUs may be obtained from a set of PRUs by, for example, selecting a subset of PRUs that may be distributed, e.g., across a set of PRUs or across a frequency region or resource allocation. By selecting a subset of PRUs that is distributed (e.g., occupying at least some non-contiguous blocks or frequencies) across a frequency region or resource allocation, this may provide LRUs which may provide at least some degree of frequency diversity for the transmitted BCH. Next, the selected subset of PRUs may be permutated (or permuted) independently within each subset, e.g., according to a permutation sequence (which may vary or be selected), which may include mapping (according to a permutation sequence) subcarriers from the PRUs to the LRUs. Alternatively, subcarriers from each of the PRUs may be directly mapped from each PRU to a corresponding LRU.

The permutation of subcarriers within each subset of PRUs may result in a (more) distributed set of subcarriers, and thus, increased frequency diversity, as compared with directly mapping subcarriers from each PRU to a respective LRU. Whereas, the direct mapping of subcarriers from each PRU of a subset of PRUs to a corresponding LRU may result in a set of LRUs, each LRU having, e.g., a contiguous set of subcarriers, but each LRU located in a different or non-contiguous frequency region as compared to the other LRUs in the subset. The technique of permutating subcarriers is described with reference to FIG. 5A, and the technique of directly mapping subcarriers from PRUs to LRUs is described with reference to FIG. 5B.

Figure 5A:
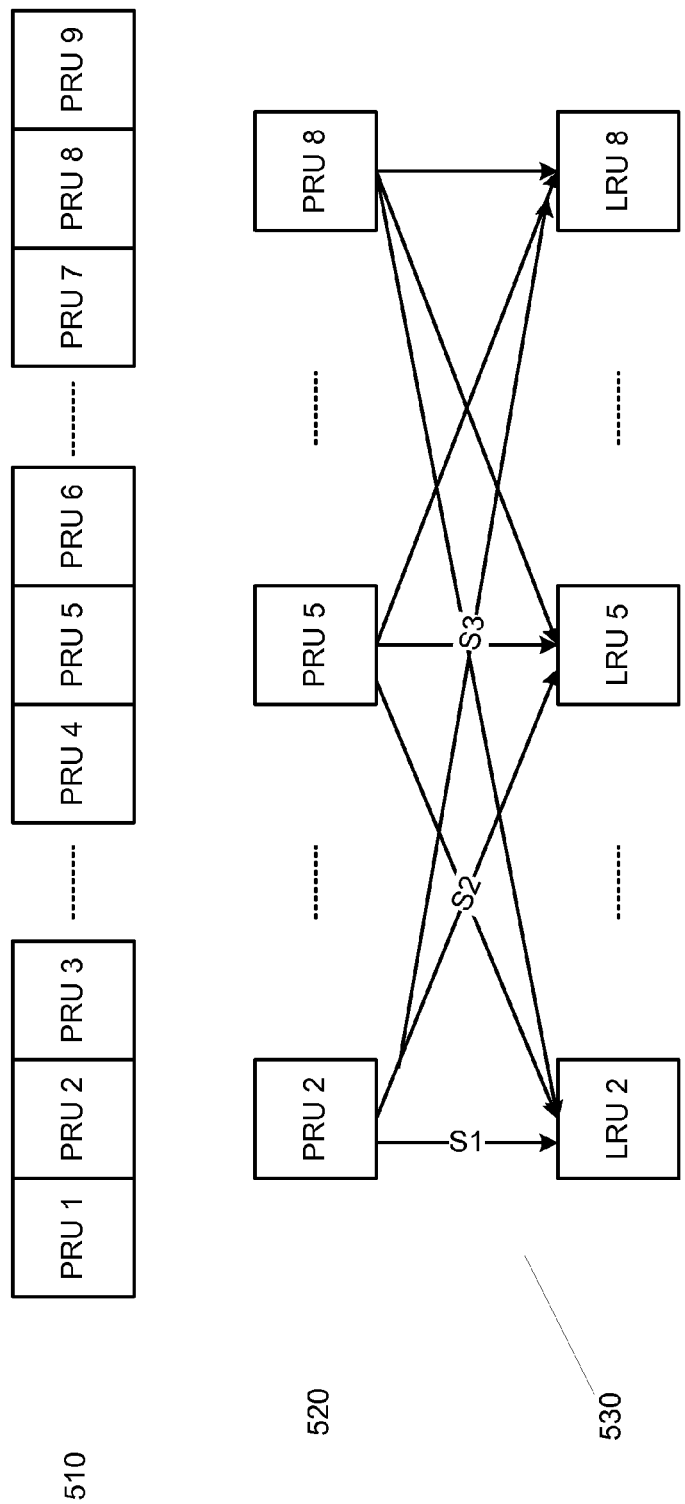
FIG. 5A is a diagram illustrating how a set of logical resource units (LRUs) may be obtained from a set of physical resource units (PRUs) according to an example embodiment.

According to an example embodiment, a set of LRUs, for use in transmitting the BCH, may be obtained based on a set of PRUs. FIG. 5A is a diagram illustrating how a set of logical resource units (LRUs) may be obtained from a set of physical resource units (PRUs) according to an example embodiment.

At 510, an example set of PRUs is shown, including PRU 1, PRU 2, PRU 3, PRU 4, PRU 5, PRU 6, PRU 7, PRU 8 and PRU 9. While only 9 PRUs are shown in this example, any number of PRUs may be used. Each of the PRUs may include a plurality of contiguous subcarriers. For example, if 18 subcarriers are provided across 6 symbols, this may provide for a total of 108 subcarriers, although any number may be used.

At 520, one or more subsets of PRUs are selected, where each subset of PRUs may include a plurality of PRUs distributed across the set of PRUs. For example, the subset, as being distributed across the set of PRUS (PRUs 1-9) may include one or more PRUs in different or non-contiguous areas of the set of PRUs (or non-contiguous PRUs), e.g., which may improve frequency diversity.

According to another example embodiment, each subset of PRUs may include a plurality of PRUs distributed substantially equally across the set of PRUs. There are different ways in which this may be accomplished. For example, PRU 2, PRU 5 and PRU 8 are selected as being distributed substantially equally across the set of PRUs (PRU 1-PRU 9). Alternatively, PRUs 1, 4, and 7 may be selected, or PRUs 3, 6, and 9 may be selected in this example. This, in an example, one PRU may be selected from each of three groups of PRUs (PRU 1-3, PRU 4-6 and PRU 7-9), or a spacing between selected PRUs may be approximately or substantially the same. For example, if there is a set of 16 PRUs, and four are selected as the subset, then one PRU may be selected from PRUs 1-4, one PRU selected from PRUs 5-8, one PRU selected from PRUs 9-12, and one PRU selected from PRUs 13-16. As another example, if 16 PRUs are the set, and 2 PRUs are selected as the subset, then one PRU may be selected from the first 8 PRUs, and another PRU may be selected from the second 8 PRUs of the set. As another example, if there are 8 PRUs in the set, and 2 PRUs will be selected as the subset, then PRU 1 and PRU 8 may be selected, or PRU 2 and PRU 7 may be selected, etc. In this manner, one or more subsets of PRUs may be selected.

At 530 of FIG. 5A, subcarriers may be permutated, e.g., independently within each subset of PRUs to obtain the LRUs (logical resource units) for the subset, which may be allocated for transmission of the BCH. Permutating subcarriers may include, for example, mapping each of the subcarriers from each of the PRUs (of the subset) to one of the plurality of the LRUs such that each LRU includes a plurality of distributed subcarriers. For example, if each of the PRUs includes three subcarriers (as an example), then one of the three subcarriers from each of PRUs 2, 5 and 8 will be mapped to one of LRUs 2, 5, and 8, as shown in FIG. 5. For example, subcarrier S1 from PRU 2 may be mapped to LRU 2, subcarrier S2 from PRU 2 may be mapped to LRU 5, and subcarrier S3 from PRU 2 may be mapped to LRU 8. This illustrates a simple example permutation sequence (e.g., where a first subcarrier of each PRU is mapped to a first LRU, a second subcarrier of each PRU is mapped to a second LRU, and a third subcarrier of each PRU is mapped to a third LRU), although any permutation sequence may be used. Subcarriers from other PRUs 5 and 8 of this subset may be similarly mapped to the different LRUs for the subset. In this manner, a plurality of LRUs may be obtained from a subset of PRUs, according to an example embodiment. Similarly, other subsets may be selected and subcarriers permutated independently within the subset (e.g., another subset of PRUs may include PRUs 1, 4, and 7, and another subset of PRUs may include PRUs 3, 6 and 9, as further examples).

The permutating of subcarriers may include, for example, for each of the K PRUs, mapping one or more subcarriers from each of the K PRUs of the subset to one of the N LRUs, e.g., according to a permutation sequence or formula, where K and N may be different numbers.

In another example embodiment, the permutating of subcarriers may include, for example, for each of the N PRUs, mapping one or more subcarriers from each of the N PRUs of the subset to one of the N LRUs, e.g., according to a permutation sequence or formula. In this example embodiment, the number of PRUs (N) in a subset of PRUs may match the number (N) of LRUs in the corresponding subset of LRUs.

Figure 5B:
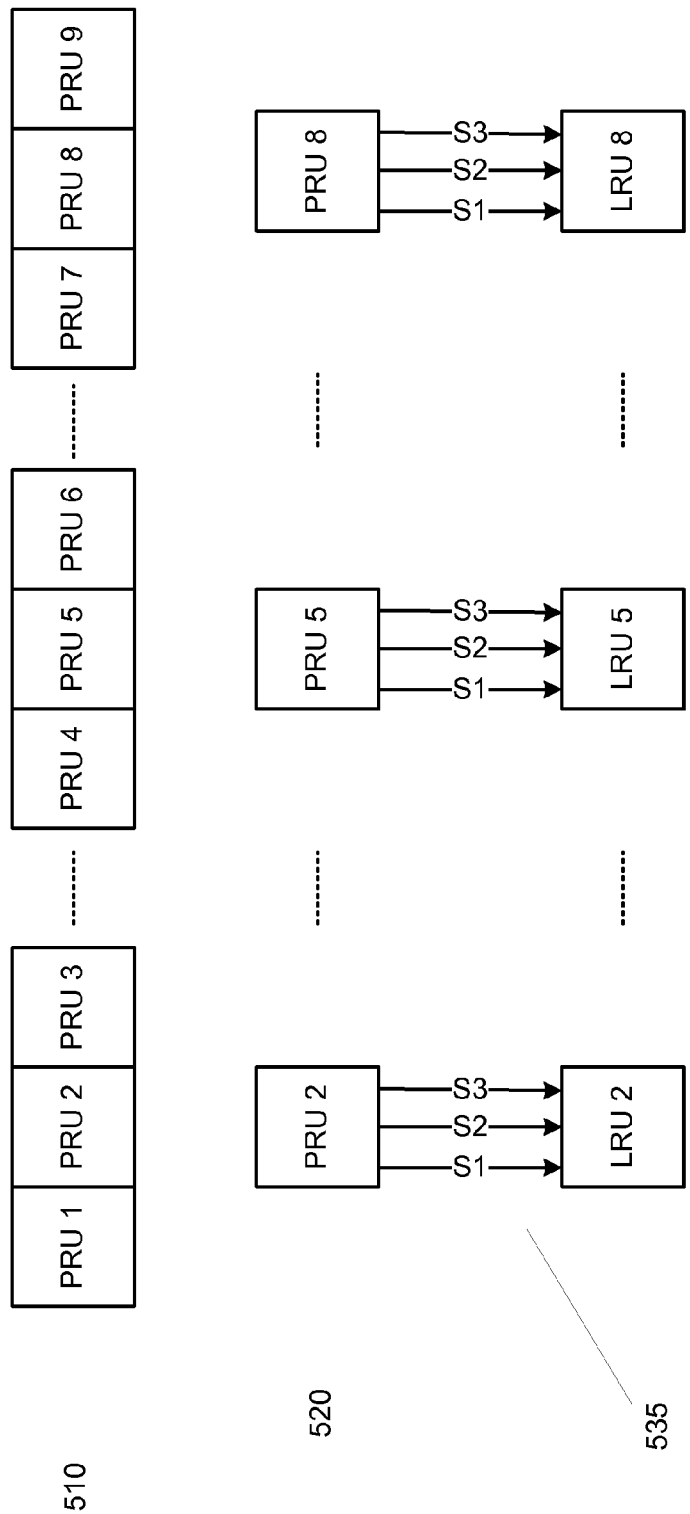
FIG. 5B is a diagram illustrating how a set of logical resource units (LRUs) may be obtained from a set of physical resource units (PRUs) according to another example embodiment.

FIG. 5B is a diagram illustrating how a set of logical resource units (LRUs) may be obtained from a set of physical resource units (PRUs) according to another example embodiment. According to an example embodiment, operations 510 and 520 of FIG. 5B may be the same or substantially similar to operations 510 and 520, respectively, of FIG. 5A. At operation 535 of FIG. 5B, the subcarriers from the subset of PRUs may be directly mapped to a subset of LRUs, e.g., subcarriers of each PRU may be directly mapped to a corresponding LRU. Thus, for example, subcarriers S1, S2 and S3 of PRU 2 may be directly (e.g., without permutation) mapped to LRU 2; subcarriers S1, S2 and S3 of PRU 5 may be directly mapped to LRU 5; and subcarriers S1, S2 and S3 of PRU 8 may be mapped to LRU 8. This is merely an example, and other examples of direct (e.g., non-permutation) mapping may be used. The direct mapping of subcarriers from each PRU of a subset to a corresponding LRU may result in a set of LRUs, each LRU having, e.g., a contiguous set of subcarriers, but each LRU located in a different or non-contiguous frequency region (or frequency range), e.g., where a space or gap may exist between corresponding LRUs in the subset. For example, due to the frequency space between PRUs 2, 5 and 8, each of the resulting LRUs 2, 5 and 8 may have a contiguous group of subcarriers but spaced apart from the other LRUs of the subset (e.g., LRUs having a gap or space between them).

As noted, the LRUs may be allocated to the BCH. The BCH may include a PBCH and a SBCH.

In an example embodiment, the PRU subcarriers may be mapped (either directly or via permutation sequence) to a number of LRUs. The LRUs may be divided into two subsets, where the first subset of LRUs may be allocated to the PBCH, and the second subset of LRUs may be allocated to the SBCH.

In an example embodiment, the PRUs may be divided into multiple subsets of PRUs, e.g., two subsets of PRUs. The first subset of PRUs may be mapped to a first subset of LRUs, and the second subset of PRUs may be mapped to a second subset of LRUs. The first subset of LRUs may be allocated to the PBCH, and the second subset of LRUs may be allocated to the SBCH.

In another example embodiment, the PRUs may be divided into two groups (one group associated with the PBCH, and another group associated with the SBCH). For each group of PRUs, one or more subsets of PRUs may be selected such that the PRUs are distributed across the group, and a subset of LRUs is obtained by either permutating or directly mapping the subcarriers of the subset of PRUs.

Thus, according to an example embodiment, a subset (e.g., N) PRUs may be selected across a predefined bandwidth (e.g., the subset including a plurality of PRUs distributed substantially equally across the predefined bandwidth, or across a frequency region or resource allocation). The predefined bandwidth may be the whole available bandwidth, or part of the whole available bandwidth. The subset of N PRUs (subcarriers of the N PRUs) may be permuted/permutated or directly mapped to obtain K logical resource units (LRUs), where LRU may be the basic logical unit for resource allocation. The K LRUs may then be used by the BS to transmit BCH. K can be the same as N, and it can also be different with N. System configuration information of the other M-N resource units (containing control channel and data) may be conveyed by BCH, e.g. the configuration of LRA and DRA partitioning.

In an example embodiment, when BCH is divided into PBCH and SBCH, the PHY channels of PBCH and SBCH may be designed in the same way, and they can also be designed in different way. When they are same, N PRUs are allocated for BCH. After permutation, K LRUs are obtained. Then, $K_1$ and $K_2$ (where $K_1+K_2=K$) LRUs are allocated for PBCH and SBCH, respectively. The permutation and frequency reuse factor may be the same for PBCH and SBCH. When they are different, $N_1$ and $N_2$ (where $N_1+N_2=N$) PRUs are first allocated for PBCH and SBCH, and are then permuted independently to obtain $K_1$ and $K_2$ LRUs. In this case, the frequency reuse factor and permutation method can be different for PBCH and SBCH. According to an example embodiment, different permutation sequences may be used for PRUs for PBCH and for SBCH. Or, PRUs for PBCH may use direct mapping to obtain corresponding LRUs, while PRUs for SBCH may be permuted or permutated using a permutation sequence to obtain the LRUs, or vice versa.

Figure 6:
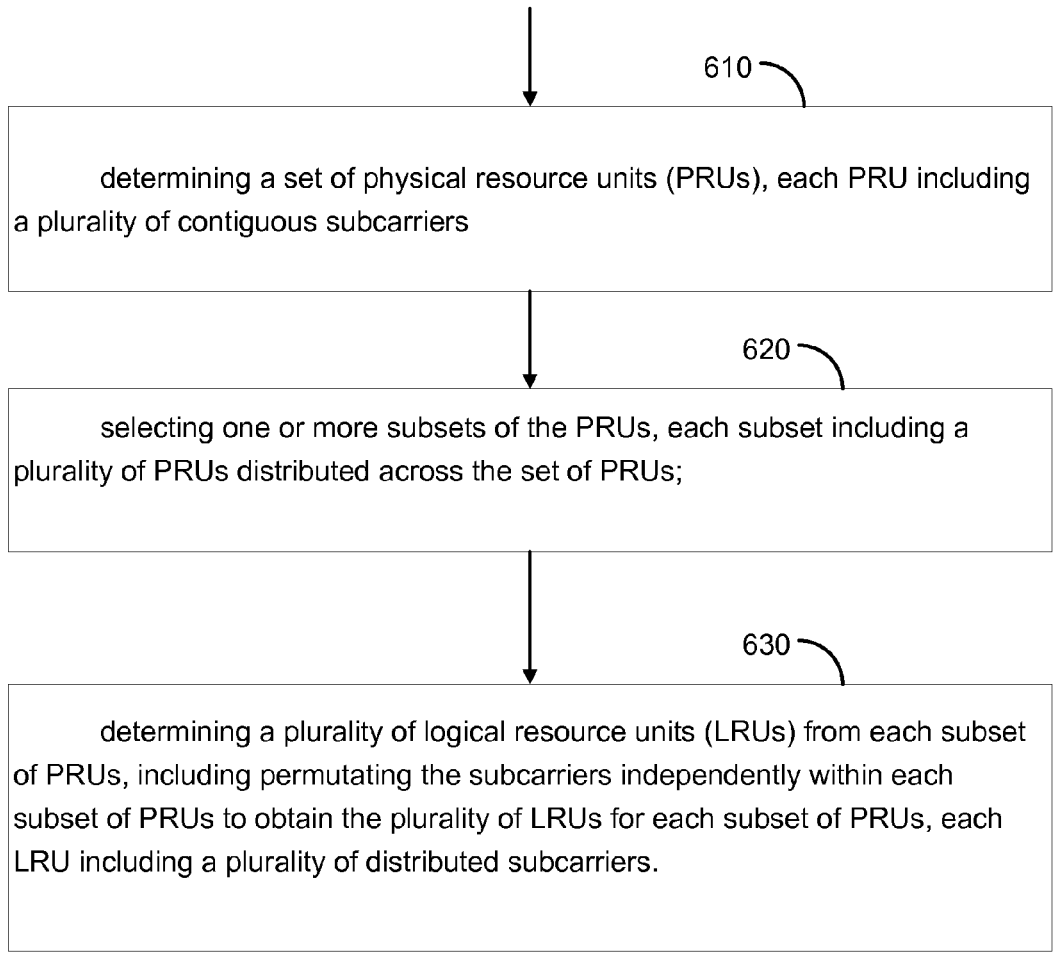
FIG. 6 is a flow chart illustrating operation of a wireless node, such as a base station, according to an example embodiment.

FIG. 6 is a flow chart illustrating operation of a base station (or a mobile station or other node) according to an example embodiment. The flow chart of FIG. 6 may be directed to a method of allocating resources for a broadcast channel for a wireless network. The method may include determining (610) a set of physical resource units (PRUs), each PRU including a plurality of contiguous subcarriers, selecting (620), by the BS, one or more subsets of the PRUs, each subset including a plurality of PRUs distributed across the set of PRUs, and determining (630), by the BS, a plurality of logical resource units (LRUs) from each subset of PRUs. For example, operation 630 may include determining a plurality of logical resource units (LRUs) from each subset of PRUs, including permutating the subcarriers independently within each subset of PRUs to obtain the plurality of LRUs for each subset of PRUs, each LRU including a plurality of distributed subcarriers.

For determining operation 610 (and similar operations described herein), the allocation or availability of PRUs may, for example, be pre-defined or may be known in advance by all nodes or stations of the network. Thus, the determining a set of PRUs 610 may include identifying or determining the fixed (or pre-defined) set of resources or PRUs, according to an example embodiment.

The selecting (620) operation may include permutating the subcarriers independently within each subset of PRUs to obtain the plurality of LRUs for each subset of PRUs, each LRU including a plurality of distributed subcarriers.

In an example embodiment, the selecting (620) may include selecting one or more subsets of the PRUs, each subset including a plurality of PRUs distributed substantially equally across the set of PRUs.

In an example embodiment, the determining operation (630) may include, for each (or one or more) of the subsets of PRUs, mapping each (or one or more) of the subcarriers from each (or one or more) of the PRUs to one of the plurality of LRUs such that each LRU includes a plurality of distributed subcarriers.

In an example embodiment, the permutating of operation 630 may include, for each of the subsets of K PRUs, mapping one or more subcarriers from each of the K PRUs of the subset to one of the N LRUs.

In an example embodiment, the permutating may include, for each of the subsets of N PRUs, mapping one or more subcarriers from each of the N PRUs of the subset to one of the N LRUs.

The flow chart of FIG. 6 may include one or more additional operations, such as allocating one or more of the plurality of LRUs for the broadcast channel (BCH). For example, all of the LRUs may be allocated to the BCH. Or, some (or a subset, or one or more) of the plurality of LRUs may be allocated to the BCH, and other(s) of the LRUs may be allocated for other purposes, e.g., for data or other control signals, for example.

In another example embodiment, the method of FIG. 6 may also include allocating one or more of the plurality of LRUs for the broadcast channel (BCH), the BCH including a primary broadcast channel (PBCH) and a secondary broadcast channel (SBCH), the allocating including: dividing the LRUs into a first subset of LRUs and a second subset of LRUs; allocating the first subset of the LRUs to the PBCH; and allocating the second subset of LRUs to the SBCH. For example, some, but not necessarily all, of the plurality of LRUs may be allocated to the BCH. The remaining LRUs may be used or allocated for other purposes, e.g., for data or other control signals.

In another example embodiment, the method of FIG. 6 may also include allocating a first subset of the plurality of LRUs to a primary broadcast channel (PBCH) of the broadcast channel (BCH), and allocating a second subset of the LRUs to a secondary broadcast channel (SBCH) of the BCH. It is not necessary that all of the LRUs be allocated for the BCH (although all of the LRUs may be allocated to the BCH). Rather, in some cases, only some of the plurality of LRUs may be allocated to the BCH (PBCH, and/or SBCH), according to an example embodiment.

Figure 7A:
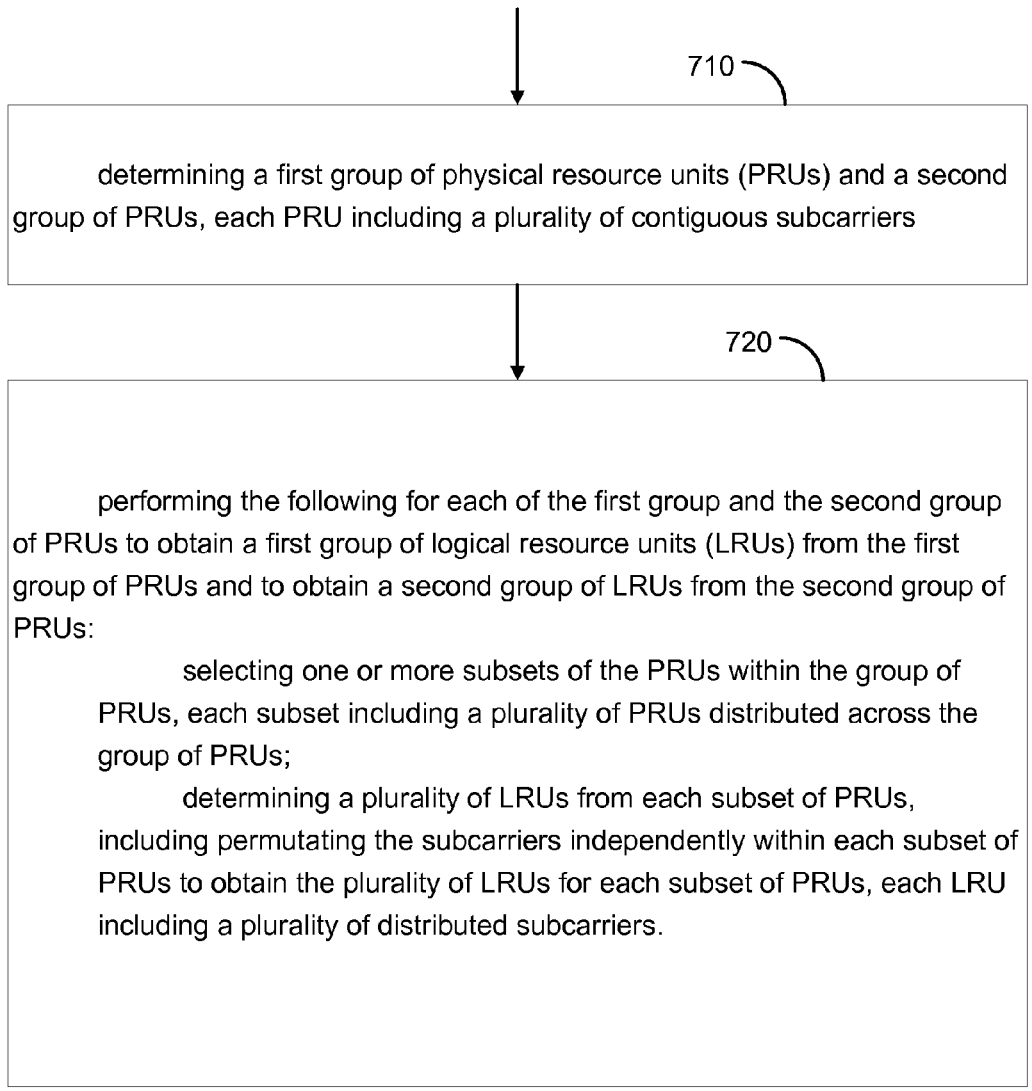
FIG. 7A is a flow chart illustrating operation of wireless node, such as a base station according to an example embodiment.

FIG. 7A is a flow chart illustrating operation of a wireless node, such as a base station or other node according to an example embodiment. The flow chart of FIG. 7A may be directed to, for example, a method of allocating resources for a broadcast channel for a wireless network.

Operation 710 may include, determining, by a BS, a first group of physical resource units (PRUs) and a second group of PRUs, each PRU including a plurality of contiguous subcarriers across one or more symbols.

Operation 720 may include, performing, by a BS, the following for each of the first group and the second group of PRUs to obtain a first group of logical resource units (LRUs) from the first group of PRUs and to obtain a second group of LRUs from the second group of PRUs: selecting one or more subsets of the PRUs within the group of PRUs, each subset including a plurality of PRUs distributed across the group of PRUs; and determining a plurality of LRUs from each subset of PRUs, including permutating the subcarriers independently within each subset of PRUs to obtain the plurality of LRUs for each subset of PRUs, each LRU including a plurality of distributed subcarriers.

In an example embodiment, in the flow chart of FIG. 7A, each PRU may include a plurality of contiguous subcarriers across one or more OFDM or OFDMA (Orthogonal Frequency Division Multiple Access) symbols, and wherein each LRU includes a plurality of distributed subcarriers across one or more OFDM or OFDMA symbols.

In an example embodiment, in the flow chart of FIG. 7A, the selecting operation of operation 720 may include selecting one or more subsets of the PRUs within the group of PRUs, each subset including a plurality of PRUs distributed substantially equally across the group of PRUs.

In an example embodiment, in the flow chart of FIG. 7A, the broadcast channel (BCH) may include a primary broadcast channel (PBCH) and a second broadcast channel (SBCH), and the method of FIG. 7 may further include allocating the first group of the LRUs to the PBCH; and allocating the second group of LRUs to the SBCH.

In an example embodiment of the method or flow chart of FIG. 7A, the broadcast channel (BCH) may include a primary broadcast channel (PBCH) and a second broadcast channel (SBCH), wherein the performing may include: determining a first group of logical resource units (LRUs) from the first group of PRUs, the first group of LRUs for allocation to the PBCH, the determining a first group of LRUs including: selecting one or more subsets of the PRUs within the first group of PRUs, each subset including a plurality of PRUs distributed substantially equally across the first group of PRUs; and determining a plurality of LRUs from each subset of PRUs of the first group of PRUs, including permutating the subcarriers independently within each subset of PRUs to obtain the first group of LRUs, each LRU including a plurality of distributed subcarriers; and determining a second group of logical resource units (LRUs) from the second group of PRUs, the second group of LRUs for allocation to the SBCH, the determining the second group of LRUs including: selecting one or more subsets of the PRUs within the second group of PRUs, each subset including a plurality of PRUs distributed substantially equally across the second group of PRUs; and determining a plurality of LRUs from each subset of PRUs of the second group of PRUs, including permutating the subcarriers independently within each subset of PRUs to obtain the second group of LRUs, each LRU including a plurality of distributed subcarriers.

Figure 7B:
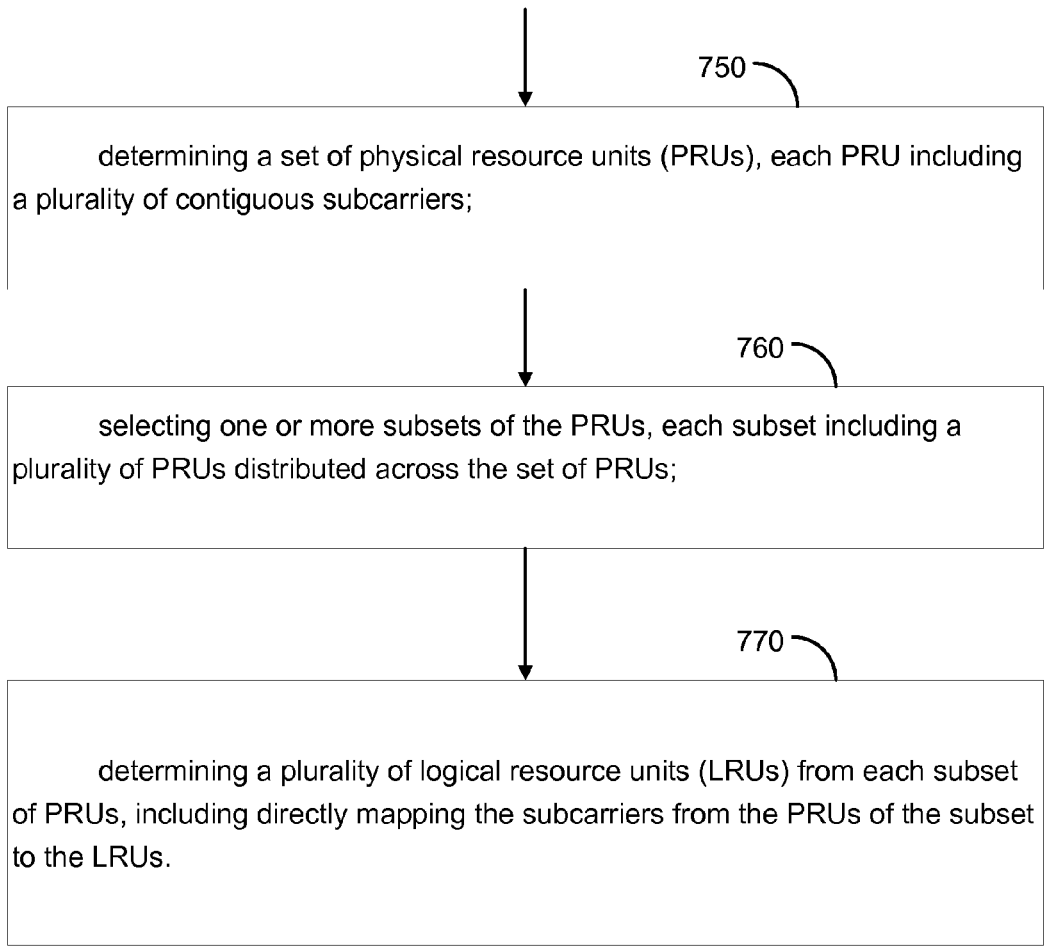
FIG. 7B is a flow chart illustrating operation of wireless node, such as a base station according to an example embodiment.

FIG. 7B is a flow chart illustrating operation of a wireless node according to another example embodiment. Operation 750 may include determining a set of physical resource units (PRUs), each PRU including a plurality of contiguous subcarriers. Operation 760 may include selecting one or more subsets of the PRUs, each subset including a plurality of PRUs distributed across the set of PRUs. Operation 770 may include determining a plurality of logical resource units (LRUs) from each subset of PRUs, including directly mapping the subcarriers from the PRUs of the subset to the LRUs.

Operation 770 may include, for example, directly mapping subcarriers from each PRU of the subset to a corresponding LRU. For example, each of the corresponding LRUs may include a group of contiguous subcarriers, each corresponding LRU provided in a different or non-contiguous frequency region (or frequency range) as compared to the other corresponding LRUs.

According to another example embodiment, an apparatus may include a wireless transceiver, and a controller coupled to the transceiver. The transceiver, under control of the controller, may be configured to: determine a set of physical resource units (PRUs), each PRU including a plurality of contiguous subcarriers; select one or more subsets of the PRUs, each subset including a plurality of PRUs distributed across the set of PRUs; and determine a plurality of logical resource units (LRUs) from each subset of PRUs by either directly mapping the subcarriers from the PRUs of the subset to the LRUs, or by permutating the subcarriers independently within each subset of PRUs to obtain the plurality of LRUs for each subset of PRUs.

Figure 8:
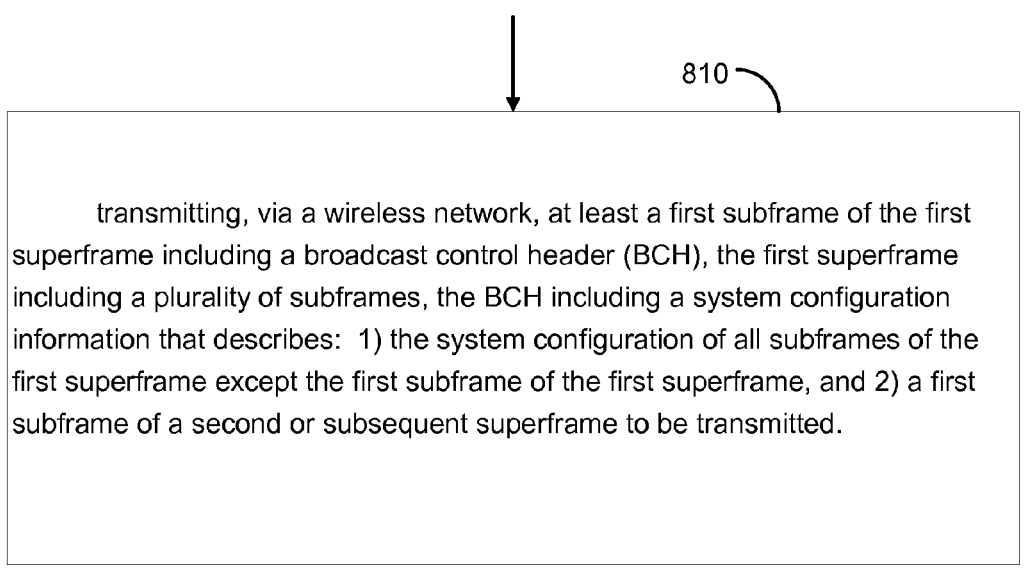
FIG. 8 is a flow chart illustrating operation of a wireless node, such as a base station, according to an example embodiment.

FIG. 8 is a flow chart illustrating operation of a base station according to an example embodiment. Transmitting operation 810 may include transmitting, by a BS, via a wireless network, at least a first subframe of the first superframe including a broadcast control header (BCH), the first superframe including a plurality of subframes, the BCH including a system configuration information that describes: 1) the system configuration of all subframes of the first superframe except the first subframe of the first superframe, and 2) a first subframe of a second or subsequent superframe to be transmitted.

Alternatively, transmitting operation 810 may include transmitting, by a BS, via a wireless network, at least a first subframe of the first superframe including a broadcast control header (BCH), the first superframe including a plurality of subframes, the BCH including a system configuration information that describes: 1) the system configuration of all subframes of the first superframe except the first subframe of the first superframe.

In an example embodiment, operation 810 may include transmitting at least a first subframe of the first superframe, the BCH of the first superframe including a system configuration information for each of a plurality of subframes of the first superframe except for the first subframe of the first superframe, the BCH of the first superframe also including a system configuration information for a first subframe of a second or subsequent superframe.

In an example embodiment, the flow chart of FIG. 8 may further include transmitting at least a first subframe of the second superframe, the system configuration of the first subframe of the second superframe being provided by system configuration information included within the first subframe of the first superframe.

In an example embodiment, the flow chart of FIG. 8 may further include transmitting at least a first subframe of the second superframe including a broadcast control header (BCH), the second superframe including a plurality of subframes, the BCH of the second superframe including a system configuration information that describes: 1) the system configuration of all subframes of the second superframe except the first subframe of the second superframe, and 2) a first subframe of a third superframe to be transmitted.

In an example embodiment of the flow chart of FIG. 8, each superframe may include L subframes, the BCH of the first superframe including configuration information that describes L-1 of the L subframes of the first superframe and a first subframe of a second superframe.

In an example embodiment of the flow chart of FIG. 8, each superframe may include 32 subframes, the BCH of the first superframe including configuration information that describes 31 of the 32 subframes of the first superframe and a first subframe of a second superframe.

According to an example embodiment, an apparatus may include a wireless transceiver; a controller coupled to the transceiver; wherein the transceiver, under control of the controller, is configured to: transmit, via a wireless network, at least a first subframe of the first superframe including a broadcast control header (BCH), the first superframe including a plurality of subframes, the BCH including a system configuration information that describes: 1) the system configuration of all subframes of the first superframe except the first subframe of the first superframe, and 2) a first subframe of a second or subsequent superframe to be transmitted.

Figure 9:
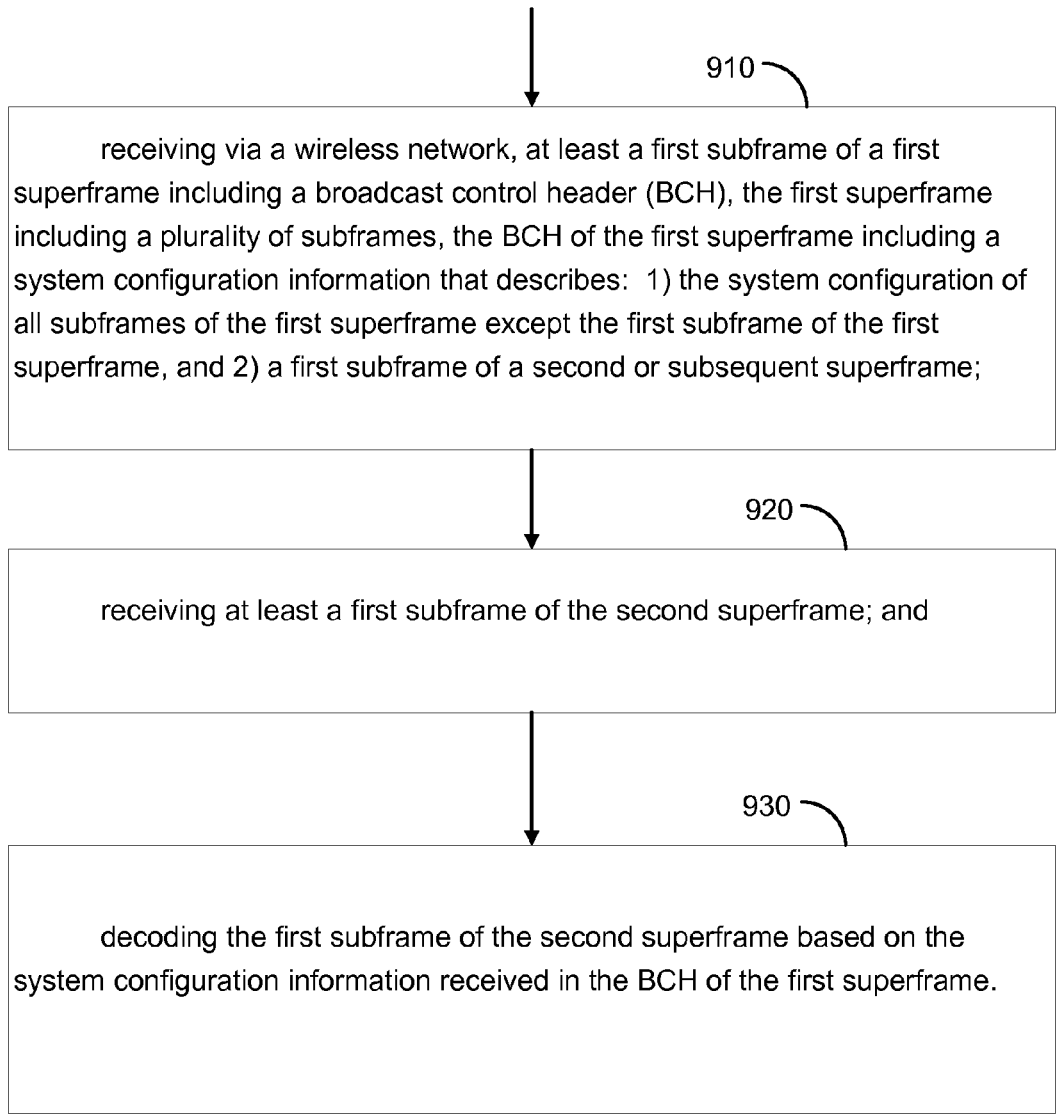
FIG. 9 is a flow chart illustrating operation of a wireless node, such as a mobile station, according to an example embodiment.

FIG. 9 is a flow chart illustrating operation of a mobile station according to an example embodiment. Receiving operation 910 may include receiving, by a MS, via a wireless network, at least a first subframe of a first superframe including a broadcast control header (BCH), the first superframe including a plurality of subframes, the BCH of the first superframe including a system configuration information that describes: 1) the system configuration of all subframes of the first superframe except the first subframe of the first superframe, and 2) a first subframe of a second or subsequent superframe; receiving, by a MS, at least a first subframe of the second superframe; and decoding the first subframe of the second superframe based on the system configuration information received in the BCH of the first superframe.

Figure 10:
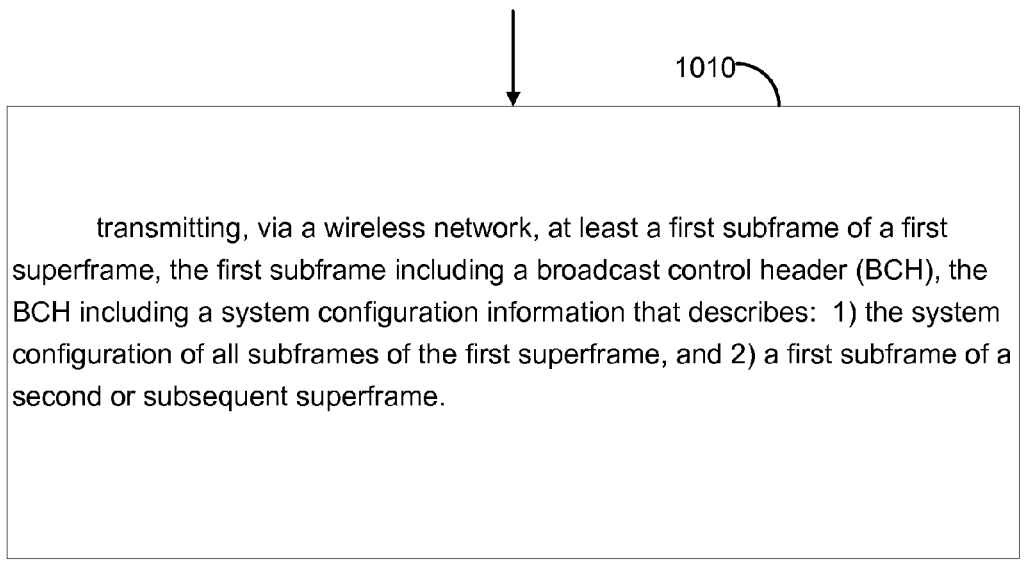
FIG. 10 is a flow chart illustrating operation of a wireless node, such as a base station, according to an example embodiment.

FIG. 10 is a flow chart illustrating operation of a base station according to an example embodiment. Transmitting operation 1010 may include transmitting, by a BS, via a wireless network, at least a first subframe of a first superframe, the first subframe including a broadcast control header (BCH), the BCH including a system configuration information that describes: 1) the system configuration of all subframes of the first superframe, and 2) a first subframe of a second or subsequent superframe.

In an example embodiment, transmitting operation 1010 may include transmitting at least the first subframe of the first superframe, the BCH of the first superframe including a system configuration information for each of all of the subframes of the first superframe, the BCH of the first superframe also including a system configuration information for a first subframe of a second or subsequent superframe.

According to an example embodiment, the flow chart of FIG. 10 may further include transmitting at least a first subframe of the second superframe, the system configuration of the first subframe of the second superframe being provided by the system configuration information included within the first subframe of the first superframe.

According to an example embodiment, the flow chart of FIG. 10 may further include transmitting at least a first subframe of the second superframe including a broadcast control header (BCH), the second superframe including a plurality of subframes, the BCH of the second superframe including a system configuration information that describes: 1) the system configuration of all subframes of the second superframe, and 2) a first subframe of a third superframe to be transmitted.

In the flow chart of FIG. 10, according to an example embodiment, each superframe includes L subframes, the BCH of the first superframe including configuration information that describes system configuration of all of the L subframes of the first superframe, and a first subframe of a second superframe.

In the flow chart of FIG. 10, according to an example embodiment, each superframe includes 32 subframes, the BCH of the first superframe including configuration information that describes system configuration of all of the 32 subframes of the first superframe, and a first subframe of a second superframe.

According to an example embodiment, an apparatus may include a wireless transceiver, a controller coupled to the transceiver, wherein the transceiver, under control of the controller, may be configured to: transmit, via a wireless network, at least a first subframe of a first superframe, the first subframe including a broadcast control header (BCH), the BCH including a system configuration information that describes: 1) the system configuration of all subframes of the first superframe, and 2) a first subframe of a second or subsequent superframe.

Figure 11:
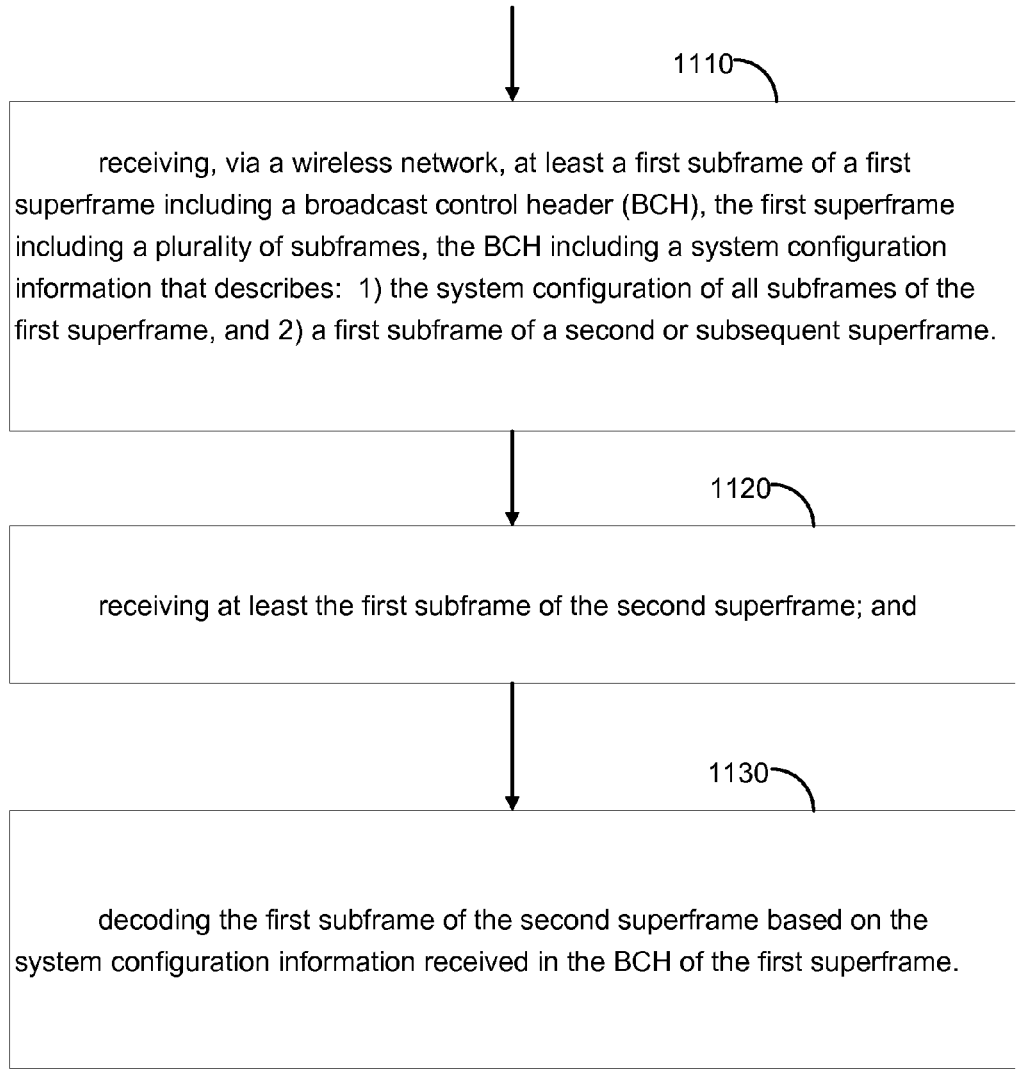
FIG. 11 is a flow chart illustrating operation of a wireless node, such as a mobile station, according to an example embodiment.

FIG. 11 is a flow chart illustrating operation of a mobile station according to an example embodiment. Receiving operation 1110 may include receiving, via a wireless network, at least a first subframe of a first superframe including a broadcast control header (BCH), the first superframe including a plurality of subframes, the BCH including a system configuration information that describes: 1) the system configuration of all subframes of the first superframe, and 2) a first subframe of a second or subsequent superframe.

Receiving operation 1120 may include receiving at least the first subframe of the second superframe.

Decoding operation 1130 may include decoding the first subframe of the second superframe based on the system configuration information received in the BCH of the first superframe.

According to an example embodiment, an apparatus may include a wireless transceiver, a controller coupled to the transceiver, wherein the transceiver, under control of the controller, may be configured to: receive, via a wireless network, at least a first subframe of a first superframe including a broadcast control header (BCH), the first superframe including a plurality of subframes, the BCH including a system configuration information that describes: 1) the system configuration of all subframes of the first superframe, and 2) a first subframe of a second or subsequent superframe; receive at least the first subframe of the second superframe; and decode the first subframe of the second superframe based on the system configuration information received in the BCH of the first superframe.

Figure 12:
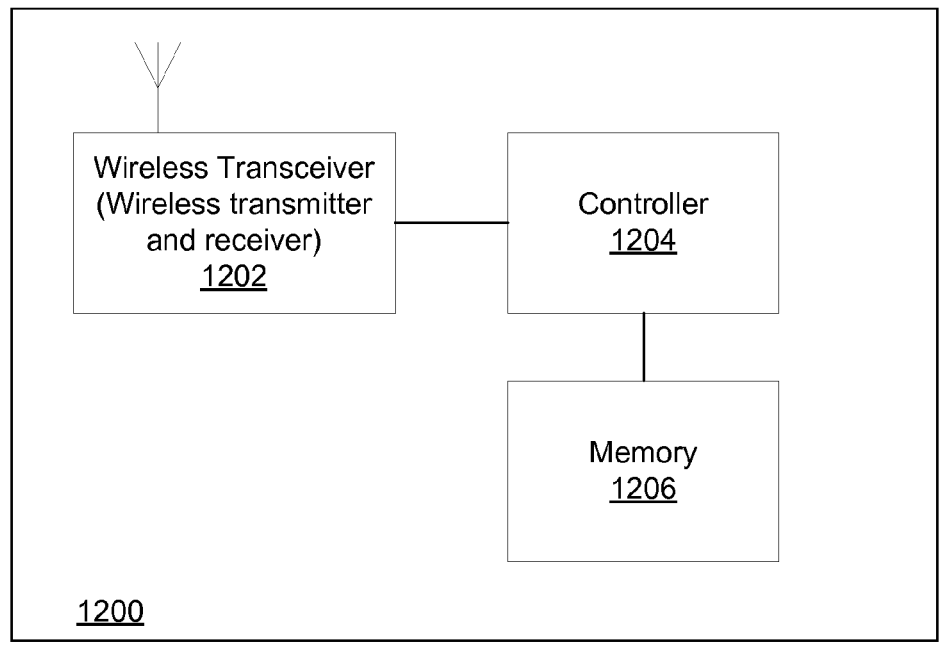
FIG. 12 is a block diagram of a wireless node according to an example embodiment.

FIG. 12 is a block diagram of a wireless station (or wireless node) 1200 according to an example embodiment. The wireless station 1200 (e.g. base station 104 or mobile node 106, 108, 110) may include, for example, a wireless transceiver (or wireless interface) 1202, including a transmitter to transmit signals and a receiver to receive signals, a controller 1204 to control operation of the station and execute instructions or software, and a memory 1206 to store data and/or instructions. Controller 1204 may also make decisions or determinations, generate frames or messages for transmission, decode received frames or messages for further processing, and other tasks or functions described herein.

Controller 1204 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 304, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   transmitting, via a wireless network, at least a first subframe of a first superframe including a broadcast control header (BCH), the first superframe including a plurality of subframes, the BCH including a system configuration information that describes: 1) the system configuration of all subframes of the first superframe except the first subframe of the first superframe, wherein the BCH includes system configuration information that includes a downlink (DL)/uplink (UL) ratio for subframes within the first superframe.

2. The method of claim 1 wherein the transmitting comprises transmitting at least a first subframe of the first superframe, the BCH of the first superframe including a system configuration information for each of a plurality of subframes of the first superframe except for the first subframe of the first superframe, the BCH of the first superframe also including a system configuration information for a first subframe of a second or subsequent superframe.

3. The method of claim 1 and further comprising transmitting at least a first subframe of the second superframe, the system configuration of the first subframe of the second superframe being provided by system configuration information included within the first subframe of the first superframe.

4. The method of claim 1 wherein each superframe includes 32 subframes, the BCH of the first superframe including configuration information that describes 31 of the 32 subframes of the first superframe.

5. The method of claim 1 wherein each subframe is allocated by a base station for either downlink (DL) transmission or uplink (UL) transmission.

6. The method of claim 1 wherein the broadcast control header (BCH) includes:
   a primary broadcast channel (PBCH) to carry network wide common information from a base station to mobile stations; and
   a secondary broadcast channel (SBCH) to carry sector specific information, where each mobile station is assigned to one of the sectors.

7. The method of claim 1 wherein the BCH includes system configuration information includes a permutation method for subcarriers within the first superframe.

8. The method of claim 1 wherein the BCH includes a system configuration information element (IE) for one or more of the subframes of the first superframe.

9. An apparatus comprising:
   a wireless transceiver;
   a controller or processor coupled to the transceiver;
   wherein the transceiver, under control of the controller, is configured to:
   transmit, via a wireless network, at least a first subframe of a first superframe including a broadcast control header (BCH), the first superframe including a plurality of subframes, the BCH including a system configuration information that describes: 1) the system configuration of all subframes of the first superframe except the first subframe of the first superframe, wherein the BCH includes system configuration information that includes a downlink (DL)/uplink (UL) ratio for subframes within the first superframe.

10. The apparatus of claim 9 wherein the transceiver being configured to transmit comprises the transceiver being configured to transmit at least a first subframe of the first superframe, the BCH of the first superframe including a system configuration information for each of a plurality of subframes of the first superframe except for the first subframe of the first superframe, the BCH of the first superframe also including a system configuration information for a first subframe of a second or subsequent superframe.

11. The apparatus of claim 9 wherein the transceiver is further configured to transmit at least a first subframe of the second superframe, the system configuration of the first subframe of the second superframe being provided by system configuration information included within the first subframe of the first superframe.

12. The apparatus of claim 9 wherein each superframe includes 32 subframes, the BCH of the first superframe including configuration information that describes 31 of the 32 subframes of the first superframe.

13. The apparatus of claim 9 wherein each subframe is allocated by a base station for either downlink (DL) transmission or uplink (UL) transmission.

14. The apparatus of claim 9 wherein the broadcast control header (BCH) includes:
   a primary broadcast channel (PBCH) to carry network wide common information from a base station to mobile stations; and
   a secondary broadcast channel (SBCH) to carry sector specific information, where each mobile station is assigned to one of the sectors.

15. The apparatus of claim 9 wherein the BCH includes system configuration information includes a permutation method for subcarriers within the first superframe.

16. A method comprising:
   transmitting, via a wireless network, at least a first subframe of a first superframe including a broadcast control header (BCH), the first superframe including a plurality of subframes, the BCH including a system configuration information that describes: 1) the system configuration of all subframes of the first superframe except the first subframe of the first superframe, wherein the BCH includes system configuration information that includes a permutation method for subcarriers within the first superframe.

17. The method of claim 16 wherein the broadcast control header (BCH) includes:
   a primary broadcast channel (PBCH) to carry network wide common information from a base station to mobile stations; and
   a secondary broadcast channel (SBCH) to carry sector specific information, where each mobile station is assigned to one of the sectors.

* * * * *